(12) United States Patent
Liang et al.

(10) Patent No.: US 12,272,780 B2
(45) Date of Patent: Apr. 8, 2025

(54) BATTERY MODULE, APPARATUS, BATTERY PACK, AND METHOD AND DEVICE FOR MANUFACTURING BATTERY MODULE

(71) Applicant: COMPTEMPORARY AMPEREX TECHNOLOGY (HONG KONG) LIMITED, Hong Kong (CN)

(72) Inventors: Chengdu Liang, Ningde (CN); Qian Liu, Ningde (CN); Quanguo Li, Ningde (CN); Yonghuang Ye, Ningde (CN); Wei Li, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 195 days.

(21) Appl. No.: 17/563,080

(22) Filed: Dec. 28, 2021

(65) Prior Publication Data

US 2022/0123375 A1 Apr. 21, 2022

Related U.S. Application Data

(63) Continuation of application No. PCT/CN2021/089665, filed on Apr. 25, 2021.

(30) Foreign Application Priority Data

Apr. 30, 2020 (CN) .......................... 202010367231.1
Aug. 7, 2020 (CN) ......................... 202010786641.X

(51) Int. Cl.
*H01M 10/42* (2006.01)
*H01M 10/04* (2006.01)
(Continued)

(52) U.S. Cl.
CPC ....... *H01M 10/04* (2013.01); *H01M 10/0525* (2013.01); *H01M 10/42* (2013.01);
(Continued)

(58) Field of Classification Search
CPC .. H01M 10/04; H01M 10/0525; H01M 10/42; H01M 10/625; H01M 16/00;
(Continued)

(56) References Cited

U.S. PATENT DOCUMENTS

| 8,993,140 B2 | 3/2015 | Schiemann et al. |
| 9,799,873 B2 | 10/2017 | Kohlberger |

(Continued)

FOREIGN PATENT DOCUMENTS

| CN | 101262049 A | 9/2008 |
| CN | 101409369 A | 4/2009 |

(Continued)

OTHER PUBLICATIONS

Machine translation JP2004342580A (Year: 2004).*

(Continued)

*Primary Examiner* — Victoria H Lynch
(74) *Attorney, Agent, or Firm* — East IP P.C.

(57) ABSTRACT

The present application provides a battery module, an apparatus, a battery pack, and a method and device for manufacturing the battery module. The battery module includes: a first-type battery cell and a second-type battery cell, which are connected in series, the first-type battery cell and the second-type battery cell are battery cells of different chemical system, and the volume energy density of the first-type battery cell is less than the volume energy density of the second-type battery cell; and the capacity Cap1 of the first-type battery cell is greater than the capacity Cap2 of the second-type battery cell. While ensuring the safety performance of the battery module, the service life and the energy throughput of the battery module are effectively improved.

20 Claims, 4 Drawing Sheets

(51) Int. Cl.
  *H01M 10/0525* (2010.01)
  *H01M 10/625* (2014.01)
  *H01M 50/258* (2021.01)
  *H01M 50/509* (2021.01)

(52) U.S. Cl.
  CPC ....... *H01M 10/625* (2015.04); *H01M 50/258* (2021.01); *H01M 50/509* (2021.01); *H01M 2220/20* (2013.01)

(58) Field of Classification Search
  CPC ........... H01M 2220/20; H01M 4/5825; H01M 50/204; H01M 50/249; H01M 50/258; H01M 50/267; H01M 50/509; Y02E 60/10; Y02P 70/50
  See application file for complete search history.

(56) References Cited

U.S. PATENT DOCUMENTS

| | | | |
|---|---|---|---|
| 10,128,528 | B2 | 11/2018 | Zhang et al. |
| 10,587,001 | B2 | 3/2020 | Park |
| 2006/0197496 | A1 | 9/2006 | Iijima et al. |
| 2007/0072059 | A1 | 3/2007 | Kitao et al. |
| 2008/0241666 | A1 | 10/2008 | Baba et al. |
| 2009/0162751 | A1 | 6/2009 | Honbo et al. |
| 2010/0136391 | A1 | 6/2010 | Prilutsky et al. |
| 2011/0086248 | A1 | 4/2011 | Nakura |
| 2012/0126753 | A1 | 5/2012 | Carkner |
| 2012/0164490 | A1 | 6/2012 | Itoi et al. |
| 2012/0189885 | A1 | 7/2012 | Kishii et al. |
| 2013/0337310 | A1 | 12/2013 | Omura et al. |
| 2014/0020235 | A1 | 1/2014 | Aramaki et al. |
| 2014/0087227 | A1 | 3/2014 | Shih et al. |
| 2014/0181551 | A1 | 6/2014 | Rahal-Arabi et al. |
| 2014/0186659 | A1 | 7/2014 | Dhar et al. |
| 2014/0220391 | A1 | 8/2014 | Fujii et al. |
| 2014/0342216 | A1 | 11/2014 | Kohlberger |
| 2015/0132625 | A1 | 5/2015 | Miyata et al. |
| 2015/0188188 | A1 | 7/2015 | Zhang et al. |
| 2015/0188207 | A1 | 7/2015 | Son et al. |
| 2015/0280276 | A1 | 10/2015 | Lemke et al. |
| 2015/0357687 | A1 | 12/2015 | Heeg et al. |
| 2015/0357688 | A1 | 12/2015 | Heeg et al. |
| 2016/0099451 | A1 | 4/2016 | Murai et al. |
| 2016/0126546 | A1 | 5/2016 | Takami et al. |
| 2016/0200214 | A1 | 7/2016 | Ishibashi et al. |
| 2016/0301045 | A1 | 10/2016 | Tyler et al. |
| 2016/0380315 | A1 | 12/2016 | Weicker et al. |
| 2017/0365886 | A1 | 12/2017 | Hoshina et al. |
| 2018/0034023 | A1 | 2/2018 | Newman et al. |
| 2018/0138478 | A1 | 5/2018 | Chan |
| 2018/0145383 | A1 | 5/2018 | Krishnan et al. |
| 2018/0159101 | A1 | 6/2018 | Tsang et al. |
| 2019/0067658 | A1 | 2/2019 | Fujiwara et al. |
| 2019/0103625 | A1 | 4/2019 | Haraguchi et al. |
| 2019/0157636 | A1 | 5/2019 | Miler et al. |
| 2019/0225093 | A1 | 7/2019 | Li et al. |
| 2019/0226859 | A1 | 7/2019 | Li et al. |
| 2019/0267686 | A1 | 8/2019 | Shimizu et al. |
| 2019/0334143 | A1 | 10/2019 | Sugeno |
| 2020/0014000 | A1 | 1/2020 | Roddy et al. |
| 2020/0058968 | A1 | 2/2020 | Thompson et al. |
| 2020/0106126 | A1 | 4/2020 | Yokoshima et al. |
| 2020/0130511 | A1 | 4/2020 | Botts et al. |
| 2020/0313255 | A1 | 10/2020 | Wu et al. |
| 2021/0050635 | A1 | 2/2021 | Lee et al. |
| 2021/0074979 | A1 | 3/2021 | Kwak et al. |
| 2021/0091428 | A1 | 3/2021 | Naito et al. |
| 2021/0296721 | A1 | 9/2021 | Omura et al. |
| 2021/0328281 | A1 | 10/2021 | Chu et al. |
| 2021/0391628 | A1 | 12/2021 | Hattendorff et al. |
| 2022/0123427 | A1 | 4/2022 | Ren et al. |

FOREIGN PATENT DOCUMENTS

| | | |
|---|---|---|
| CN | 101504977 A | 8/2009 |
| CN | 101635372 A | 1/2010 |
| CN | 101675555 A | 3/2010 |
| CN | 201749897 U | 2/2011 |
| CN | 102027617 A | 4/2011 |
| CN | 102447301 A | 5/2012 |
| CN | 202308227 U | 7/2012 |
| CN | 101242011 B | 9/2012 |
| CN | 103311562 A | 9/2013 |
| CN | 104126238 A | 10/2014 |
| CN | 104979503 A | 10/2015 |
| CN | 105006586 A | 10/2015 |
| CN | 105186066 A | 12/2015 |
| CN | 105849968 A | 8/2016 |
| CN | 105914804 A | 8/2016 |
| CN | 106207016 A | 12/2016 |
| CN | 206225503 U | 6/2017 |
| CN | 107004920 A | 8/2017 |
| CN | 107112603 A | 8/2017 |
| CN | 107256971 A | 10/2017 |
| CN | 206567773 U | 10/2017 |
| CN | 108598598 A | 9/2018 |
| CN | 208507849 U | 2/2019 |
| CN | 109428114 A | 3/2019 |
| CN | 208674305 U | 3/2019 |
| CN | 109659465 A | 4/2019 |
| CN | 109782182 A | 5/2019 |
| CN | 110048151 A | 7/2019 |
| CN | 110065414 A | 7/2019 |
| CN | 110071236 A | 7/2019 |
| CN | 209071461 U | 7/2019 |
| CN | 110265591 A | 9/2019 |
| CN | 110265627 A | 9/2019 |
| CN | 110380144 A | 10/2019 |
| CN | 110444835 A | 11/2019 |
| CN | 110456275 A | 11/2019 |
| CN | 110678393 A | 1/2020 |
| CN | 110739424 A | 1/2020 |
| CN | 210040332 U | 2/2020 |
| CN | 210403875 U | 4/2020 |
| CN | 111106277 A | 5/2020 |
| CN | 111106278 A | 5/2020 |
| CN | 111446488 A | 7/2020 |
| CN | 111584792 A | 8/2020 |
| CN | 211295236 U | 8/2020 |
| CN | 111668408 A | 9/2020 |
| CN | 111668409 A | 9/2020 |
| CN | 211629259 U | 10/2020 |
| CN | 111900294 A | 11/2020 |
| CN | 213584016 U | 6/2021 |
| DE | 102012215495 A1 | 3/2014 |
| DE | 202017104111 U1 | 11/2018 |
| DE | 102017212223 A1 | 1/2019 |
| EP | 1265302 A2 | 12/2002 |
| EP | 3193402 A1 | 7/2017 |
| EP | 3261161 A1 | 12/2017 |
| EP | 3316391 A1 | 5/2018 |
| EP | 3358706 A1 | 8/2018 |
| EP | 3675218 A1 | 7/2020 |
| EP | 3905377 A1 | 11/2021 |
| EP | 3926724 A2 | 12/2021 |
| JP | H07320775 A | 12/1995 |
| JP | H11121041 A | 4/1999 |
| JP | 2003174734 A | 6/2003 |
| JP | 2004342580 A | 12/2004 |
| JP | 2005071917 A | 3/2005 |
| JP | 2006079987 A | 3/2006 |
| JP | 2007059145 A | 3/2007 |
| JP | 2008226518 A | 9/2008 |
| JP | 2009021223 A | 1/2009 |
| JP | 2010250984 A | 11/2010 |
| JP | 2011065906 A | 3/2011 |
| JP | 2012113899 A | 6/2012 |
| JP | 2012234696 A | 11/2012 |
| JP | 2013509688 A | 3/2013 |
| JP | 2014072025 A | 4/2014 |
| JP | 2014112463 A | 6/2014 |

(56) References Cited

FOREIGN PATENT DOCUMENTS

| | | | |
|---|---|---|---|
| JP | 2015018706 A | 1/2015 | |
| JP | 2015133169 A | 7/2015 | |
| JP | 2015170591 A | 9/2015 | |
| JP | 2015530858 A | 10/2015 | |
| JP | 2015204247 A | 11/2015 | |
| JP | 2015211025 A | 11/2015 | |
| JP | 2016139510 A | 8/2016 | |
| JP | 2017139844 A | 8/2017 | |
| JP | 2019003881 A | 1/2019 | |
| JP | 2019009042 A | 1/2019 | |
| JP | 2019129149 A | 8/2019 | |
| JP | 2019139879 A | 8/2019 | |
| JP | 2020035692 A | 3/2020 | |
| JP | 2020527848 A | 9/2020 | |
| JP | 2023509197 A | 3/2023 | |
| JP | 2023509198 A | 3/2023 | |
| WO | 2004095611 A1 | 11/2004 | |
| WO | 2009113281 A1 | 9/2009 | |
| WO | 2011114349 A2 | 9/2011 | |
| WO | 2012014418 A1 | 2/2012 | |
| WO | 2012060031 A1 | 5/2012 | |
| WO | 2013031613 A1 | 3/2013 | |
| WO | 2013069308 A1 | 5/2013 | |
| WO | 2013099293 A1 | 7/2013 | |
| WO | 2014045569 A1 | 3/2014 | |
| WO | 2017191679 A1 | 11/2017 | |
| WO | 2019065110 A1 | 4/2019 | |
| WO | 2019123903 A1 | 6/2019 | |
| WO | 2019161751 A1 | 8/2019 | |
| WO | 2019187313 A1 | 10/2019 | |
| WO | 2020133659 A1 | 7/2020 | |
| WO | 2020133660 A1 | 7/2020 | |
| WO | 2020134054 A1 | 7/2020 | |
| WO | 2020135152 A1 | 7/2020 | |

OTHER PUBLICATIONS

Machine translatin CN208674305U (Year: 2019).*
The International search report for PCT Application No. PCT/CN2021/089665, dated Jul. 30, 2021, 17 pages.
The International search report for PCT Application No. PCT/CN2021/089319, dated Jul. 26, 2021, 14 pages.
The First Office Action for Chinese Application No. 202010786641.X, dated Oct. 26, 2022, 16 pages.
The First Office Action for Chinese Application No. 202010786523.9, dated Oct. 24, 2022, 17 pages.
The extended European search report for EP Application No. 21789597.8, dated Nov. 16, 2022, 11 pages.
The partial supplementary extended European search report for EP Application No. 21789597.8, dated Aug. 12, 2022, 13 pages.
The extended European search report for EP Application No. 21790065.3, dated Nov. 18, 2022, 11 pages.
The partial supplementary extended European search report for EP Application No. 21790065.3, dated Aug. 18, 2022, 13 pages.
The First Office Action for Indian Application No. 202217009095, dated Dec. 16, 2022, 6 pages.
The International search report for PCT Application No. PCT/CN2020/105474, dated Apr. 26, 2021, 15 pages.
General Rules For Analytical scanning electron microscopy. JYT 010-1996, 12 pages.
Particle Size Analysis—Laser Diffraction Methods. GBT 19077-2016, 47 pages.
The extended European search report for European Application No. 20947010.3, dated Jan. 25, 2023, 9 pages.
The First Office Action for Chinese Application No. 202080054687.0, dated Jul. 24, 2023, 8 pages.
The extended European search report for European Application No. 20947817.1, dated Nov. 30, 2022, 7 pages.
The International search report for PCT Application No. PCT/CN2020/139180, dated Sep. 29, 2021, 6 pages.
The extended European search report for European Application No. 20955830.3, dated Mar. 30, 2023, 8 pages.
The International search report for PCT Application No. PCT/CN2020/119738, dated Jun. 25, 2021, 8 pages.
The International search report for PCT Application No. PCT/CN2020/129475, dated Aug. 16, 2021, 6 pages.
The Search Report by Registered Search Organization for Japanese Application No. 2022-539699, dated Jul. 13, 2023, 25 pages.
The International search report for PCT Application No. PCT/CN2020/119737, dated Jul. 2, 2021, 5 pages.
The International search report for PCT Application No. PCT/CN2020/119736, dated Apr. 28, 2021, 8 pages.
The International search report for PCT Application No. PCT/CN2021/109686, dated Apr. 25, 2022, 6 pages.
The Second Office Action for Chinese Application No. 202010786523.9, dated Feb. 28, 2023, 10 pages.
The Non-final Office Action for U.S. Appl. No. 17/970,603, dated Jul. 19, 2023, 19 pages.
The First Office Action for Chinese Application No. 202080054659.9, dated Jun. 24, 2023, 12 pages.
The Non-final Office Action for U.S. Appl. No. 17/892,621, dated Feb. 3, 2023, 6 pages.
The Search Report by Registered Search Organization for Japanese Application No. 2022-542009, dated Aug. 16, 2023, 37 pages.
The First Office Action for Japanese Application No. 2022-542009, dated Sep. 4, 2023, 6 pages.
The Requirement for Restriction/Election for U.S. Appl. No. 18/054,375, dated Jul. 7, 2023, 8 pages.
The Non-final Office Action for U.S. Appl. No. 18/054,375, dated Aug. 24, 2023, 12 pages.
The extended European search report for EP Application No. 20961838.8, dated Aug. 17, 2023, 10 pages.
The Non-final Office Action for U.S. Appl. No. 17/985,851, dated Mar. 22, 2023, 9 pages.
The First Office Action for Japanese Application No. 2022-539699, dated Jul. 31, 2023, 8 pages.
The Non-final Office Action for U.S. Appl. No. 17/985,813, dated Mar. 8, 2023, 17 pages.
The Non-final Office Action for U.S. Appl. No. 17/985,813, dated Jun. 14, 2023, 19 pages.
The Final Office Action for U.S. Appl. No. 17/985,813, dated Aug. 9, 2023, 24 pages.
The Notice of Allowability for U.S. Appl. No. 17/985,813, dated Dec. 12, 2023, 9 pages.
The extended European search report for EP Application No. 20955828.7, dated Sep. 27, 2023, 6 pages.
The Search Report by Registered Search Organization for Japanese Application No. 2022-542013, dated Aug. 14, 2023, 48 pages.
The First Office Action for Japanese Application No. 2022-542013, dated Oct. 2, 2023, 9 pages.
The Non-Final Office Action for U.S. Appl. No. 18/053,493, dated Mar. 9, 2023, 28 pages.
The extended European search report for EP Application No. 21937198.6, dated Aug. 14, 2023, 6 pages.
The Non-final Office Action for U.S. Appl. No. 18/149,672, dated May 30, 2023, 7 pages.
The Second Office Action for Japanese Application No. 2022-542009, dated Feb. 5, 2024, 9 pages.
The extended European search report for EP Application No. 20955829.5, dated Mar. 25, 2024, 8 pages.
The Notice of Allowability for U.S. Appl. No. 17/985,813, dated Feb. 22, 2024, 12pages.
The Notice of Allowability for Japanese Application No. 2022542013, dated Mar. 18, 2024, 6 pages.
The Non-final Office Action for U.S. Appl. No. 18/053,493, dated Jan. 29, 2024, 39 pages.
The Non-Final Office Action for U.S. Appl. No. 17/970,603, dated Apr. 18, 2024, 17 pages.
The Notice of Allowance for KR Application No. 10-2022-7021878, dated May 10, 2024, 6 pages.
The Notice of Allowance for CN Application No. 202080104131.8, dated Dec. 11, 2024, 6 pages.

(56) References Cited

OTHER PUBLICATIONS

The First Office Action for CN Application No. 202080104131.8, dated Jun. 4, 2024, 12 pages.

* cited by examiner

BATTERY MODULE, APPARATUS, BATTERY PACK, AND METHOD AND DEVICE FOR MANUFACTURING BATTERY MODULE

CROSS-REFERENCE TO RELATED APPLICATION

This application is a continuation of International Application No. PCT/CN2021/089665, filed on Apr. 25, 2021, which claims priority to Chinese Patent Application No. 202010367231.1 entitled "Battery Module, Apparatus, Battery Pack, and Method and Device for Manufacturing Battery Module" and filed on Apr. 30, 2020, and claims priority to Chinese Patent Application No. 202010786641.X entitled "Battery Module, Apparatus, Battery Pack, and Method and Device for Manufacturing Battery Module" and filed on Aug. 7, 2020, which are incorporated herein by reference in their entireties.

TECHNICAL FIELD

This application relates to the technical field of energy storage devices, in particular to a battery module, an apparatus, a battery pack, and a method and a device for manufacturing the battery module.

BACKGROUND

Secondary batteries are clean and renewable resources, which can be used as driving energy sources or storage units in vehicles, energy storage and other fields.

With the increasing requirements for environmental protection of energy sources, the application of the secondary batteries has become increasingly popular and widespread. In order to adapt to the needs of different environments and application scenarios, the industry puts forward new requirements for the performance of the secondary batteries. For example, the secondary batteries are used as the driving energy sources of new energy vehicles. In order to meet the increasing endurance requirements of vehicles, the requirements for secondary energy are continuously increased.

The secondary battery is often formed of a combination of multiple battery cells. The overall energy of the secondary battery is often enhanced by increasing the number of battery cells in the industry; or the energy of the secondary battery is enhanced by developing battery cells of a new chemical system, for example, battery cells of nickel cobalt manganese oxide (NCM) chemical system are developed. The battery cell of NCM chemical system uses an NCM ternary material as a positive electrode material of the battery cell, which has higher volume energy density than an LFP material adopted by the positive electrode of the commonly used battery cell of lithium iron phosphate (hereinafter referred to as LFP) chemical system, and thus can obtain higher energy under the same volume conditions.

However, the effect of improving the energy of the secondary battery can be achieved by adding the number of battery cells, but the weight and volume of the secondary battery will also increase correspondingly, such that the use of the secondary battery is limited; and for the battery cell of NCM chemical system, its NCM material has serious gas production and increased internal resistance in use, resulting in serious heating of the battery cells, high expansion rate and other undesirable phenomena, which seriously affects the life cycle and the safety performance of the battery.

CN208674305U provides a battery module, including at least two ternary battery cells connected in series and a safety battery cell connected in series with the ternary battery cells. The safety battery cell includes a lithium-manganate battery cell and/or a lithium-iron-phosphate battery cell; the heat diffusion of the safety battery cell is less than that the ternary battery cell, so the safety battery cell can effectively block the overall heat runaway diffusion of the battery module or delay the time of heat diffusion, thereby improving the safety performance of the battery module. However, it is discovered in use that the energy of the ternary battery cell cannot fully release the energy during the charging and discharging cycle process, which affects the performance of the battery module.

For this reason, how to ensure the safety performance of the secondary battery while further improving the energy of the secondary battery is an urgent problem to be solved by those skilled in the art.

SUMMARY

In order to solve the above problems, the present application provides a battery module, an apparatus, a battery pack, and a method and a device for manufacturing the battery module, which can effectively improve the energy of the battery module while ensuring the safety performance of the battery module.

In order to achieve the above objectives, a first aspect of the present application provides a battery module, including: a first-type battery cell and a second-type battery cell, which are connected in series, wherein the first-type battery cell and the second-type battery cell are battery cells of different chemical systems, and the volume energy density of the first-type battery cell is less than the volume energy density of the second-type battery cell; and the capacity Cap1 of the first-type battery cell is greater than the capacity Cap2 of the second-type battery cell.

In the present application, the "battery cell" refers to a battery unit that can be independently charged and discharged. The battery cell structure includes a positive electrode, a negative electrode, a membrane, an electrolyte and an outer package used for packaging the positive electrode, the negative electrode, the membrane and the electrolyte. The types and shapes of the battery cells are not particularly limited in the present application, so the battery cells can be soft package battery cells, cylindrical battery cells, or square battery cells and other types of battery cells. The "battery module" is formed by electrically connecting a certain number of battery cells together and putting them into a frame to protect the battery cells from external impact, heat, vibration and the like. A "battery pack" is made by assembling various control and protection systems such as battery management systems and heat management components on one or more battery modules (or directly combined by multiple battery cells).

The "battery cells of a chemical system" are classified according to the types of positive electrode materials of the battery cells, and the doped or added accessories are not limited. For example, the battery cell with lithium iron phosphate (including element-doped) as the positive electrode material can be defined as a battery cell of lithium iron phosphate chemical system; the battery cell with lithium nickel cobalt manganate (generally referred to as NCM) as the positive electrode material can be defined as an NCM chemical-system battery cell; and the battery cell with lithium nickel cobalt aluminate (generally referred to as NCA) as the positive electrode material is an NCA chemical-system battery cell, and both the NCM chemical-system battery cell and the NCA chemical-system battery cell belong to battery cells of ternary material chemical system.

"Capacity" refers to the initial capacity of the battery cell, and the specific value thereof is: the capacity of the first-type battery cell and the second-type battery cell at room temperature (25° C.), measured within the specific charging and discharging cut-off voltages and with 0.33 C as the discharging rate, and the unit is Ampere hour (abbreviated as Ah).

The volume energy density of the second-type battery cell is greater than the volume energy density of the first-type battery cell, so that under the same volume conditions, the second-type battery cell has more energy than the first-type battery cell. The capacity Cap1 of the first-type battery cell is greater than the capacity Cap2 of the second-type battery cell, so that during the charging and discharging cycle process of the battery module, the impact of the first-type battery cell on the energy release of the second-type battery cell is reduced, and the characteristic of large energy density of the second-type battery cell is fully exerted, thereby ensuring the energy of the battery module and improving the energy throughput and the service life of the battery module.

In some possible embodiments, the capacity Cap1 of the first-type battery cell and the capacity Cap2 of the second-type battery cell satisfy: $0.01 \leq (Cap1/Cap2) - 1 \leq 0.5$.

The energy density of the first-type battery cell is less than the energy density of the second-type battery cell, and under the same volume, the energy of the second-type battery cell is greater than the energy of the first-type battery cell. The capacity Cap1 of the first-type battery cell is greater than the capacity Cap2 of the second-type battery cell, so that the impact on the release energy (the product of the capacity of the battery cell and the plateau voltage determines the release energy of the battery cell, and the energy unit is Watt hour, abbreviated as Wh) of the second-type battery cell (i.e., the battery cell with high volume energy density) caused by the serial connection of the first-type battery cell and the second-type battery cell can be fully relieved. However, for the battery cells based on the same chemical system, the greater the capacity is, the greater the volume is. If the ratio (Cap1/Cap2) of the capacity value of the first-type battery cell to the capacity value of the second-type battery cell is too large, the greater the volume ratio of the first-type battery cell in the battery module is, and the lower the overall volume energy density of the battery module is, thus affecting the overall performance of the battery module. By controlling the value of (Cap1/Cap2) within the range of $0.01 \leq (Cap1/Cap2) - 1 \leq 0.5$, the safety of the battery module can be ensured, the energy of the second-type battery cell is fully released, and meanwhile, the safety and the overall energy density of the battery are also considered, thereby improving the overall performance of the battery module. The specific settings need to be determined according to the selection of different chemical-system type batteries and the actual needs of the batteries. In some exemplary embodiments, $0.02 \leq (Cap1/Cap2) - 1 \leq 0.25$, and in some other exemplary embodiments, $0.04 \leq (Cap1/Cap2) - 1 \leq 0.15$.

In some possible embodiments, before the capacity retention rate of the first-type battery cell and the second-type battery cell decays to 80% of the capacity (initial capacity), the capacity decay rate of the second-type battery cell is less than the capacity decay rate of the first-type battery cell, i.e., when the capacity retention rate of the first-type battery cell and the second-type battery cell decays to 80% of the capacity (initial capacity), the number of cycles of the second-type battery cell is greater than the number of cycles of the first-type battery cell. In the vehicle application and other fields of the secondary battery, during the recycling process of the battery (referring to all battery cells or the entire battery pack on the vehicle), when the battery ages to a certain extent (for example, its capacity decays to be less than 80% of its initial capacity), the requirements of vehicle operation may not be satisfied. For this reason, in the present application, the capacity of the first-type battery cell under working conditions decays faster, and the capacity of the second-type battery cell decays more slowly. Through the capacity matching design of the two types of battery cells, the initial capacity of the battery cell with faster decay rate is improved to prolong the overall service life of the battery module, that is, increase the number of cycles of the battery before the overall decay rate of the battery module reaches 80%.

In some possible embodiments of the present application, the battery module includes a first-type battery cells and b second-type battery cells, wherein a and b are natural numbers, and $a \geq 1$, $b \geq 1$. $0.1 \leq a/b \leq 50$. In some exemplary embodiments, $0.5 \leq a/b \leq 30$, and in some other exemplary embodiments, $1 \leq a/b \leq 10$.

In the present application, the first-type battery cell has high capacity, low energy density and high safety; the second-type battery cell has low capacity, high energy density and wore safety; and the first-type battery cell is conducive to the energy exertion of the second-type battery cell with high energy density, but with the increase of the number of the first-type battery cells, the overall energy density of the battery module is directly reduced. As mentioned above, the number ratio (a/b) of the first-type battery cells and the second-type battery cells is $0.1 \leq a/b \leq 3$, which can improve the overall volume energy density of the battery module while ensuring the overall safety performance of the battery module and realizing the energy release of the second-type battery cells, thereby improving the overall performance of the battery module.

In some possible embodiments, if $a \geq 2$, the first-type battery cells and the second-type battery cells are arranged in at least one row, and at least a part of the second-type battery cells is located between two first-type battery cells.

Gas generation, swelling, heat generation and other phenomena may occur during the charging and discharging cycle process of the battery cell, which forms stress in the battery, and excessive stress will affect the performance and the service life of the battery. The first-type battery cells and the second-type battery cells belonging to different chemical systems have different swelling degree and heat conductivity. The first-type battery cells and the second-type battery cells are arranged at intervals in parallel to realize heat conduction. In a high-temperature operating environment, the low-temperature battery cells absorb the heat of the high-temperature battery cells in an appropriate amount, thereby effectively suppressing the heat diffusion rate and the heating rate of the high-temperature battery cells, and improving the overall safety performance of the battery module. In a low-temperature operating environment, the high-temperature battery cells transfer heat to the low-temperature battery cells, thereby improving the operating state of the low-temperature battery cells, which in return improves the overall working performance of the battery module. The structure in which the first-type battery cells and the second-type battery cells are arranged at intervals also helps to alleviate the problem of local stress concentration caused by the centralized arrangement of the same chemical-system battery cells, and by means of the reasonable arrangement of the first-type battery cells and the second-type battery cells, the internal stress of the battery can be effectively released, and the safety performance of the battery module is improved.

In some possible embodiments, the first-type battery cell and the second-type battery cell satisfy at least one of the following conditions:

Condition 1: the ratio of the specific heat capacity C1 of the first-type battery cell to the specific heat capacity C2 of the second-type battery cell is $0.9 \leq C1/C2 \leq 10$. In some exemplary embodiments, it may be $1 \leq C1/C2 \leq 6$, and in some other exemplary embodiments, it may be $1.5 \leq C1/C2 \leq 3$.

The specific heat capacity refers to the amount of heat absorbed (or released) when a certain material per unit mass rises (or declines) per unit temperature. The greater the specific heat capacity is, the stronger the heat absorption or heat dissipation capability of the substance is. When the battery cell per unit mass is heated with the same amount of heat, the greater the specific heat capacity is, the smaller the temperature rise of the battery cell is. On the contrary, when the battery cell per unit mass is heated with the same amount of heat, the smaller the specific heat capacity is, the greater the temperature rise of the battery cell is. In the present application, the two battery cells with different specific heat capacities are connected together, the battery cell with greater temperature rise can transfer heat to the battery cell with smaller temperature rise, which is beneficial to the overall heat management of the module and the battery pack. Specifically, the C1/C2 is controlled within the range of $0.9 \leq C1/C2 \leq 10$. By controlling the heat absorption capacity of the first-type battery cell and the second-type battery cell, and adjusting the overall heat distribution during the operation of the module, the operating performance of the module is optimized. For example, in the high-temperature operating environment, the battery cell with high specific heat capacity properly absorbs the heat emitted by the battery cell with low specific heat capacity; and in the low-temperature operating environment, the battery cell with low specific heat capacity transfers heat to the battery cell with high specific heat capacity, thereby optimizing the overall heat distribution of the battery module, which in return improves the operating state of the battery module.

Condition 2: the ratio of the heat conductivity coefficient $\lambda 1$ of the first-type battery cell to the heat conductivity coefficient $\lambda 2$ of the second-type battery cell is $0.5 \leq \lambda 1/\lambda 2 \leq 3$. In some exemplary embodiments, it may be $0.7 \leq \lambda 1/\lambda 2 \leq 2$, and in some other exemplary embodiments, it may be $0.9 \leq \lambda 1/\lambda 2 \leq 1.5$. In the present application, the heat conductivity coefficient of the battery cell refers to a heat conductivity coefficient value in a direction perpendicular to the large surface of an electrode plate. "The large surface of the electrode plate" refers to the direction parallel to the surface of the active material of the electrode plate in the electrode plate of the battery cell, and the direction perpendicular to the large surface of the electrode plate is the measurement direction of the heat conductivity coefficient.

The heat conductivity coefficient reflects the heat conduction capability of the material, and the higher the value is, the stronger the heat conduction capability is. In the present application, the speed and capability of heat transfer in the first-type battery cell and the second-type battery cell and between the two types of battery cells are controlled by controlling the ratio of the heat conductivity coefficients ($\lambda 1/\lambda 2$) of the first-type battery cell and the second-type battery cell. Specifically, the battery cell with a greater heat conductivity coefficient transfers heat faster, and the battery cell with a smaller heat conductivity coefficient transfers heat more slowly. The two types of battery cells with different heat conductivity coefficients are connected together, on one hand, in the low-temperature operating environment, the battery cell with faster heat transfer can transfer heat to the adjacent battery cell with slower heat transfer; and on the other hand, in the high-temperature or greater heat generation environment, the battery cell with faster heat transfer will not accumulate heat, thus ensuring better low-temperature performance and higher safety performance of the module and the battery pack. In the embodiment of the present application, the value of $\lambda 1/\lambda 2$ is controlled within the range of $0.5 \leq \lambda 1/\lambda 2 \leq 3$. The overall heat transfer rate and the heat distribution of the module can be effectively adjusted to optimize the operating performance of the module. For example, in the high-temperature operating environment, the high-temperature battery cell transfers heat to the low-temperature battery cell in time to avoid the overall performance degradation of the battery module caused by uneven heat distribution; and in the low-temperature operating environment, the high-temperature battery cell transfers heat to the low-temperature battery cell in time to heat up the low-temperature battery cell in time, thereby optimizing the overall heat distribution of the battery module, which in return improves the operating state of the battery module.

Condition 3: the ratio of the density $\rho 1$ of the first-type battery cell to the density $\rho 2$ of the second-type battery cell is $0.6 \leq \rho 1/\rho 2 \leq 3$. In some exemplary embodiments, it may be $0.8 \leq \rho 1/\rho 2 \leq 2$, and in some other exemplary embodiments, it may be $0.9 \leq \rho 1/\rho 2 \leq 1.5$.

The density of the battery cell also affects the heat transfer capability. In the present application, by controlling the density ratio ($\rho 1/\rho 2$) of the first-type battery cell and the second-type battery cell, the speed and capability of heat transfer in the first-type battery cell and the second-type battery cell and between the two types of battery cells are controlled. The value of $\rho 1/\rho 2$ is controlled within the above range. The overall heat transfer rate and the heat distribution of the module can be effectively adjusted to optimize the operating performance of the module. For example, in the high-temperature operating environment, the high-temperature battery cell transfers heat to the low-temperature battery cell in time to avoid the overall performance degradation of the battery module caused by uneven heat distribution; and in the low-temperature operating environment, the high-temperature battery cell transfers heat to the low-temperature battery cell in time to heat up the low-temperature battery cell in time, thereby optimizing the overall heat distribution of the battery module, which in return improves the operating state of the battery module It is worth noting that the specific heat capacity ratio, the heat conductivity coefficient ratio and the density ratio of the first-type battery cell and the second-type battery cell are cooperated, coordinated and debugged based on the types of the battery cells, the structure of the battery module and the application environments to optimize the overall performance of the battery module.

In some possible embodiments, the average capacity Cap$1n$ of the first-type battery cells is greater than the capacity Cap$2n$ of the second-type battery cells. In some exemplary embodiments, $0.01 \leq (Cap1n/Cap2n)-1 \leq 0.5$.

The present application comprises multiple first-type battery cells and second-type battery cells, and the value of the average capacity ratio (Cap$1n$/Cap$2n$) of the first-type battery cells and the second-type battery cells is controlled within the range of $0.01 \leq (Cap1n/Cap2n)-1 \leq 0.5$, therefore the safety of the battery module can be ensured, and meanwhile, the safety and the overall capacity exertion of the battery are guaranteed while fully releasing the discharging capacity of the second-type battery cells, thus improving the overall performance of the battery module. The specific value can be determined by the design requirements of the battery module. In some exemplary embodiments, $0.02 \leq (Cap1n/Cap2n)-1 \leq 0.25$, and in some other exemplary embodiments, $0.04 \leq (Cap1n/Cap2n)-1 \leq 0.15$.

In some possible embodiments, the first-type battery cell and the second-type battery cell include, but are not limited to, lithium/sodium/magnesium ion battery cells, lithium/sodium/magnesium metal battery cells, lithium/sodium/magnesium-all-solid-state/semi-solid-state/quasi-solid-state/polymer/gel electrolyte-battery cells, and other rechargeable secondary battery cells. The types of the battery cells are not specifically limited in the present application.

In some possible embodiments, in the present application, the first-type battery cell and the second-type battery cell satisfy at least one of the following conditions: the plateau voltage V1 of the first-type battery cell is from 3.15 V±0.05 V to 4.75 V±0.05 V; and the plateau voltage V2 of the second-type battery cell is from 3.60 to 3.80 V±0.05 V.

In the present application, the "plateau voltage" refers to: for a battery cell whose positive electrode material of the battery cell is a two-phase phase change material (such as LFP), its phase change voltage is its plateau voltage; and for a battery cell whose positive electrode material of the battery cell is a solid solution material (such as LCO or a ternary material), the plateau voltage is a voltage when its discharging capacity reaches a half of its initial capacity. Examples of specific values are: the plateau voltage of the conventional lithium-cobaltate chemical-system battery cell is about 3.7 V, the plateau voltage of the lithium-manganate (referred to as LMO) chemical-system battery cell is about 3.8 V, the plateau voltage of the NCM chemical-system battery cell is from 3.5 V to 3.85 V, and the plateau voltage of the lithium-iron-phosphate (LFP) chemical-system battery cell is about 3.22 V.

In some possible embodiments, the product of the capacity and the plateau voltage of the first-type battery cell is greater than the product of the capacity and the plateau voltage of the second-type battery cell.

In the present application, it is specifically enumerated that the first-type battery cell may be an LFP chemical-system battery cell or an LMO chemical-system battery cell, and the like, and the second-type battery cell may be a ternary material chemical-system battery cell (such as an NCM chemical-system battery cell or an NCA chemical-system battery cell), and the like.

During the operation of the battery cell, the voltage and the capacity of the battery cell are key factors for the energy release of the battery cell, and a reasonable plateau voltage helps to improve the battery performance. The specific selection is determined according to the capacity of the battery cell and the actual needs of the battery module.

In some possible embodiments, the first-type battery cell is a lithium-iron-phosphate chemical-system battery cell; and the second-type battery cell is a ternary material chemical-system battery cell.

The second aspect of the present application provides a battery pack, including the above-mentioned battery module.

In the present application, the "battery pack" may refer to a final state of the battery system installed in an electricity application apparatuses such as an electric vehicle.

An apparatus provided by the present application includes the above-mentioned battery module and uses the battery module as a power source. The apparatus includes, but is not limited to: vehicles, ships, airplanes, and various energy storage devices. The type and scope of the apparatus are not limited in the present application.

The third aspect of the present application provides a method for manufacturing a battery module, including:
  obtaining a first-type battery cell and a second-type battery cell, wherein the first-type battery cell and the second-type battery cell are battery cells of different chemical systems;
  the volume energy density of the first-type battery cell is less than the volume energy density of the second-type battery cell;
  connecting the first-type battery cell and the second-type battery cell in series to form the battery module; and
  the capacity Cap1 of the first-type battery cell is greater than the capacity Cap2 of the second-type battery cell.

In some possible embodiments, the step of obtaining the first-type battery cell and the second-type battery cell includes: obtaining a first-type battery cells and b second-type battery cells, wherein a and b are natural numbers, and $a \geq 1$, $b \geq 1$. $0.1 \leq a/b \leq 50$. In some exemplary embodiments, $0.5 \leq a/b \leq 30$, and in some other exemplary embodiments, $1 \leq a/b \leq 10$.

In some possible embodiments, the step of connecting the first-type battery cell and the second-type battery cell in series includes:
  if $a \geq 2$, arranging the first-type battery cells and the second-type battery cells in at least one row, and locating at least a part of the second-type battery cells between the two first-type battery cells; and
  connecting the first-type battery cell and the second-type battery cell in series.

In some possible embodiments, the capacity Cap1 of the first-type battery cell and the capacity Cap2 of the second type of cell satisfy the following condition: $0.01 \leq (Cap1/Cap2)-1 \leq 0.5$. In some exemplary embodiments $0.02 \leq (Cap1/Cap2)-1 \leq 0.25$, and in some other exemplary embodiments, $0.04 \leq (Cap1/Cap2)-1 \leq 0.15$.

In the method of manufacturing the battery module provided in the present application, for further description of the selected first-type battery cell and the second-type battery cell, reference may be made to the above battery module, and no repeated description will be given herein.

The fourth aspect of the present application provides a device for manufacturing a battery module, including a processor for controlling a clamping arm to obtain a first-type battery cell and a second-type battery cell that are different chemical system battery cells, and further for controlling an assembly component to connect the first-type battery cell and the second-type battery cell in series to form the battery module,
  wherein the volume energy density of the first-type battery cell is less than the volume energy density of the second-type battery cell; and
  the capacity Cap1 of the first-type battery cell is greater than the capacity Cap2 of the second-type battery cell.

In the device for manufacturing the battery module provided in the present application, for further description of the selected first-type battery cell and the second-type battery cell, reference may be made to the above battery module, and no repeated description will be given herein.

In addition to the technical problems solved by the embodiments of the present application described above, the technical features constituting the technical solutions, and the beneficial effects brought by the technical features of these technical solutions, the other technical problems capable of being solved by the battery and the apparatus provided by the embodiments of the present application, other technical features contained in the technical solutions, and the beneficial effects brought by these technical features will be described in further detail in the specific description of the embodiments.

DESCRIPTION OF THE DRAWINGS

In order to explain the technical solutions of the embodiments of the present application more clearly, the following will briefly introduce the drawings that need to be used in the embodiments of the present application. Obviously, the drawings described below are only some embodiments of the present application. A person of ordinary skill in the art can obtain other drawings based on the drawings without creative work.

DETAILED DESCRIPTION

As described in the background art, under some circumstances, the energy of the secondary battery is often increased by increasing the number of battery cells of the secondary battery or developing battery cells with high volume energy density such as the NCM chemical-system battery cell. However, the mass and volume of the secondary battery will be increased due to the increase of the battery cells, and the NCM chemical-system battery cell has worse safety performance. If the LFP chemical-system battery cell with a high safety factor is connected in series with the NCM chemical-system battery cell for use, the characteristic of high volume energy density of the NCM chemical-system battery cell cannot be exerted. How to improve the output energy of the secondary battery while considering the safety of the secondary battery is still a problem to be solved urgently in the industry.

The inventors conducted research on the characteristics of different chemical-system battery cells. The energy value of the battery cell is: energy=capacity*plateau voltage. The capacity of the battery cell directly determines the energy output of the battery cell. The battery cells of different chemical-system types have different service life decay modes.

Figure 1:
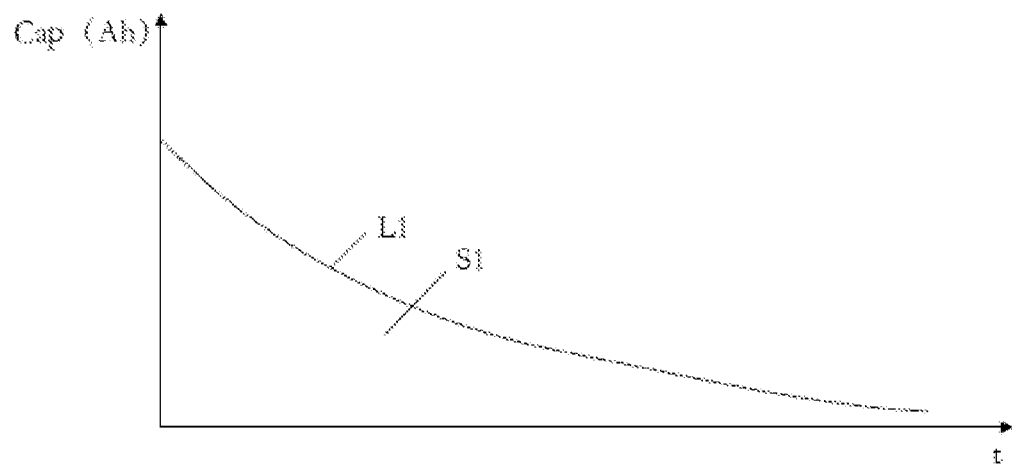
FIG. 1 is a schematic diagram showing the relationship between the capacity retention and the service life of a battery cell in an embodiment of a lithium-iron-phosphate chemical-system battery cell under some circumstances.

As shown in FIG. 1, it is a schematic diagram showing the relationship between the capacity retention and the service life of a battery cell in an embodiment of an LFP chemical-system battery cell, the X axis represents the working time of the battery cell, i.e., represents the service life of the battery cell, and the Y axis represents the capacity of the battery cell (the unit is Ah). L1 represents a capacity decay curve of the LFP chemical-system battery cell, the service life of the LFP chemical-system battery cell decays faster in the early stage, then gradually slows down and approaches to a linear decay mode, and the flat linear slope changes from large to small in the later stage. The energy when the battery cell circulates to the $L^{th}$ circle is $E_L$, and the value of $E_L$ is, wherein $V_L$ represents the plateau voltage of the LFP battery cell, and $Cap._L$ represents the capacity of the LFP chemical-system battery cell. In this way, the cumulative energy output during the theoretical life cycle of the LFP is $E_{Lt}$, wherein x represents the total number of cycles; S1 represents the area from the lower side of L1 to the X axis region part, which indicates the total cumulative capacity of the LFP chemical-system battery cell throughout the life cycle, and S1 determines the total energy output of the LFP chemical-system battery cell throughout the life cycle.

Figure 2:
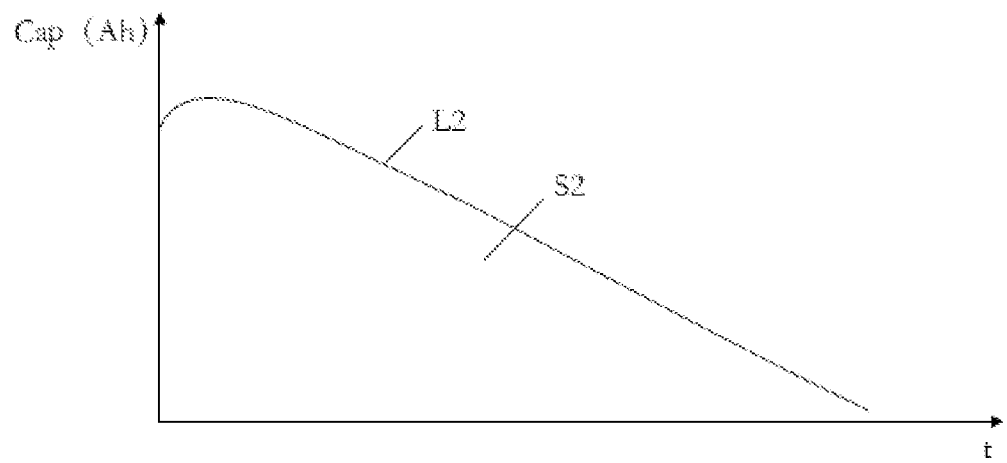
FIG. 2 is a schematic diagram showing the relationship between the capacity retention and the service life of a battery cell in an embodiment of an NCM chemical-system battery cell under some circumstances.

With reference to FIG. 2, FIG. 2 is a schematic diagram showing the relationship between the capacity retention and the service life of a battery cell in an embodiment of an NCM chemical-system battery cell. L2 represents the capacity decay curve of the NCM chemical-system battery cell, the NCM chemical-system battery cell decays slowly in the early stage, and decays faster and approaches to the linear decay mode in the later stage. The energy when the battery cell circulates to the nth circle is $E_N$, wherein $V_N$ represents the plateau voltage of the NCM chemical system battery cell, and $Cap._N$ represents the capacity of the NCM chemical system battery cell. The cumulative energy output during the theoretical life cycle is $E_{Nt}$, in which y represents the total number of cycles. S2 represents the area from the lower side of L2 to the X axis region part, which indicates the total cumulative capacity of the NCM chemical-system battery cell throughout the life cycle, and S2 determines the total energy output of the NCM chemical-system battery cell throughout the life cycle.

Theoretically, when a LFP chemical-system battery cells and b NCM chemical-system battery cells in the secondary battery cells are connected in series, the cumulative energy output within the theoretical life cycle is $E_T$, and $E_T = aE_{Lt} + bE_{Nt}$.

However, the inventor further found through research that, when the secondary battery is formed by connecting the battery cells of different chemical system types in series, the energy when the secondary battery circulates to the $k^{th}$ circle during actual use is $E_k$, $E_h = (a*V_L + b*V_N)*min.Cap(L,N)$, the cumulative energy output within the actual life circle is $E_{Kt}$, $$E_{Kt} = \Sigma_{k=0}^{z} E_k,$$

where z represents the total number of cycles, and min.Cap.(L,N) represents the capacity of the battery cell with the minimum capacity among the battery cells connected in series.

Figure 3:
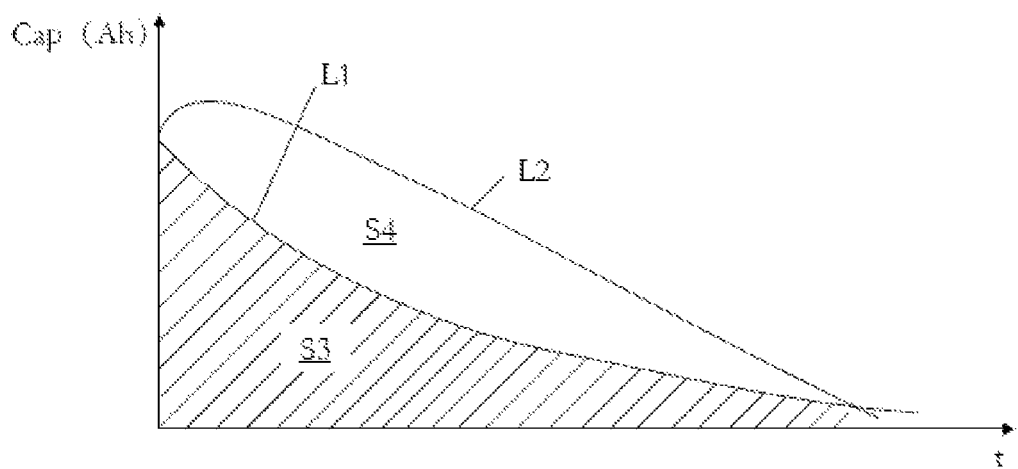
FIG. 3 is a schematic diagram showing the relationship between the capacity retention and the service life of a battery cell in a battery module in an embodiment in which a lithium-iron-phosphate chemical-system battery cell and an NCM chemical system battery cell are connected in series under some circumstances.

With reference to FIGS. 1-3, in the module formed by connecting the LFP chemical-system battery cell in FIG. 1 and the NCM chemical-system battery cell in FIG. 2 in series (wherein the LFP chemical-system battery cell and the NCM chemical-system battery cell have the same capacity value), the output energy of the module is the sum of the energy corresponding to the capacity of the overlapping part of S1 in FIG. 1 and S2 in FIG. 2, i.e., the energy corresponding to the capacity represented by the filling part S3 in FIG. 3, and the energy (it originally belongs to the energy contained in the NCM chemical-system battery cell) corresponding to the capacity represented by the filling part S4 does not exert the function, i.e., being wasted (wherein, when the module is discharged, the LFP chemical-system battery cell and the NCM chemical-system battery cell use the respective common plateau voltages, for example, the plateau voltage of the LFP chemical-system battery cell is 3.22 v, and the plateau voltage of the NCM chemical-system battery cell is 3.68 v).

It can be seen that, during the actual operation of the secondary battery cell, each battery cell connected in series will affect the performance of the secondary battery, the theoretical cumulative energy output of the battery cannot be realized, and the total amount of energy released by the secondary battery depends on the battery cell with the minimum capacity. In FIG. 3, even though the NCM chemical-system battery cell has higher total capacity within the life cycle (i.e., it has greater theoretical output energy than the LFP chemical-system battery cell), the actual output is severely limited by the capacity decay trend of the LFP chemical-system battery cell within the life cycle, and high-efficiency energy output cannot be achieved, which affects the overall energy output efficiency of the secondary battery.

To this end, the present application provides a battery module, including: a first-type battery cell and a second-type battery cell, which are connected in series, wherein the first-type battery cell and the second-type battery cell are different chemical-system battery cells, and the volume energy density of the first-type battery cell is less than the volume energy density of the second-type battery cell.

The capacity Cap1 of the first-type battery cell is greater than the capacity Cap2 of the second-type battery cell.

Figure 4:
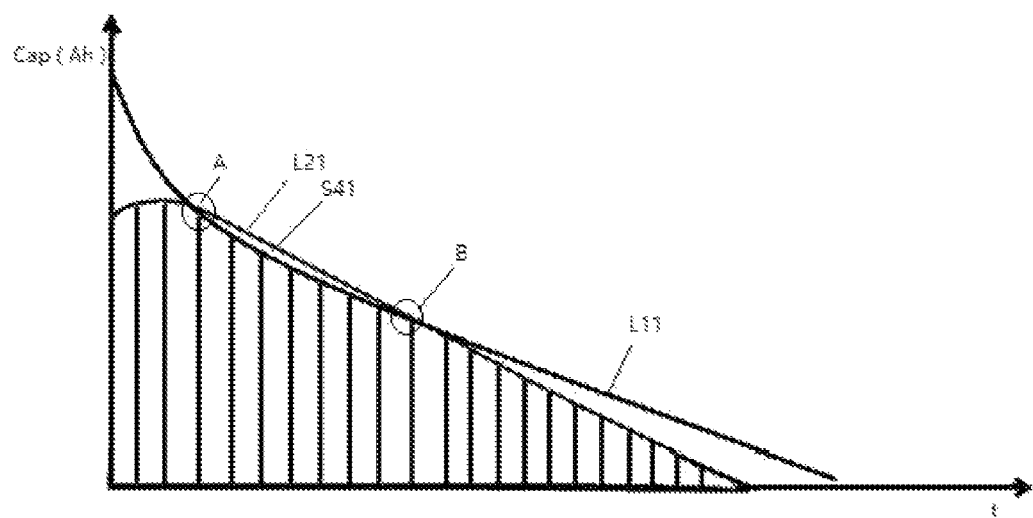
FIG. 4 is a schematic diagram showing the relationship between the capacity retention and the service life of a battery cell in a battery module in an embodiment of the battery module of the present application.

With reference to FIG. 4, FIG. 4 is a schematic diagram showing the relationship between the capacity retention and the service life of a battery cell in a battery module in an embodiment of the battery module of the present application. In this embodiment, the LFP chemical-system battery cell is used as the first-type battery cell, and the NCM chemical-system battery cell is used as the second-type battery cell. The capacity Cap1 of the first-type battery cell is greater than the capacity Cap2 of the second-type battery cell. Specifically, the optional values of Cap1 and Cap2 are between 5 Ah and 500 Ah, such as 5 Ah, 10 Ah, 100 Ah, 250 Ah, 500 Ah, and so on. The first-type battery cell and the second-type battery cell are connected in series; and then the plateau voltage is adjusted according to the characteristics of each type of battery cell. In this embodiment, the first-type battery cell is an LFP battery cell, and its plateau voltage is set to 3.22 V, and the second-type battery cell is an NCM battery cell, its plateau voltage is set to 3.68 V, and the charging and discharging run in cycles.

Continuing to refer to FIG. 4, L11 represents a capacity retention curve of the first-type chemical-system battery cell, and L21 represents the capacity retention curve of the second-type chemical-system battery cell.

It can be seen from the figure that, the capacity (initial capacity) of the first-type chemical-system battery cell is greater than the capacity (initial capacity) of the second-type chemical-system battery cell; then, at the first half segment, the capacity of the first-type chemical-system battery cell decays faster in the early stage, the capacity of the second-type chemical-system battery cell decays more slowly in the early stage, and the capacity values of the two types of battery cells are the same for the first time at an intersection A of L11 and L21; and during this period, the total energy output of the battery module depends on the total capacity of the second-type battery cell, even if the total theoretical capacity of the first-type battery cell is greater than the total theoretical capacity of the second-type battery cell; and thereafter, the capacity protection quantity of the first-type battery cell gradually slows down and approaches to the linear decay mode, the flat linear slope changes from large to small in the later stage, and the second-type battery cell decays faster in the later stage and approaches to the linear decay mode. During this period, the capacity values of the two types of battery cells are the same for the second time (i.e., an intersection B of L11 and L21). Between the point A and the point B, the total energy output of the battery module depends on the total capacity of the first-type battery cell, even if the total theoretical capacity of the second-type battery cell is greater than the total theoretical capacity of the first-type battery cell; and after the point B, the total energy output of the battery module depends on the total capacity of the second-type battery cell, even if the total theoretical capacity of the first-type battery cell is greater than the total capacity of the second-type battery cell.

The energy corresponding to the capacity represented by the area S41 formed by the curves L11 and L21 between the two points A and B is the unreleased energy of the second-type battery cell. However, it can be seen from the comparison of FIG. 3 and FIG. 4 that, in this embodiment, by adjusting the capacity value of the first-type battery cell to be greater than the capacity value of the second-type battery cell, the area of S41 in FIG. 4 is obviously less than the area of S4 in FIG. 3, i.e., the energy waste of the second-type battery cell is effectively reduced. The battery module provided in this embodiment releases the energy of the second-type battery cell with high energy density more efficiently, and gives full play to the characteristic of large volume energy density of the second-type battery cell (i.e., the battery cell with high volume energy density), thereby ensuring the overall energy output of the battery module and improving the performance of the battery module.

However, for the same chemical-system battery cell, the greater the volume is, the greater the stored capacity is. If the ratio (Cap1/Cap2) of the capacity value of the first-type battery cell to the capacity value of the second-type battery cell is too large, the greater the volume ratio of the first-type battery cell is, the lower the overall capacity density of the battery module is, which affects the overall performance of the battery module. In this embodiment, the capacity Cap1 of the first-type battery cell and the capacity Cap2 of the second-type battery cell satisfy the following conditions: $0.01 \leq (Cap1/Cap2)-1 \leq 0.5$, so as to ensure the safety of the battery module, and meanwhile to consider the safety and the exertion of the overall capacity of the battery while fully releasing the discharging capacity of the second-type battery cell. Accordingly, the overall performance of the battery module is improved, the total energy throughput of the module is maximum, the low-temperature and high-temperature capacity and energy retention rate are the highest, and the safety performance is optimal. In some examples, $0.02 \leq (Cap1/Cap2)-1 \leq 0.25$, and in some other examples, $0.04 \leq (Cap1/Cap2)-1 \leq 0.15$.

In some embodiments of the present application, before the capacity retention rate of the first-type battery cell and the second-type battery cell decays to 80% of the capacity (initial capacity), the capacity decay rate of the second-type battery cell is less than the capacity decay rate of the first-type battery cell, i.e., when the capacity retention rate of the first-type battery cell and the second-type battery cell decays to 80% of the capacity (initial capacity), the number of cycles of the second-type battery cell is greater than the number of cycles of the first-type battery cell.

In the vehicle application and other fields of the secondary battery, during the recycling process of the battery (referring to all battery cells or the entire battery pack on the vehicle), when the battery ages to a certain extent (for example, its capacity decays to be less than 80% of its initial capacity), the requirements of vehicle operation may not be satisfied. For this reason, in the present application, the capacity of the first-type battery cell under working conditions decays faster, and the capacity of the second-type battery cell decays more slowly. Through the capacity matching design of the two types of battery cells, the initial capacity of the battery cell with faster decay rate is improved to prolong the overall service life of the battery module, i.e., increasing the number of cycles of the battery before the overall decay rate of the battery module reaches 80%.

In some embodiments, the first-type battery cell and the second-type battery cell satisfy at least one of the following conditions: the plateau voltage V1 of the first-type battery cell is from 3.15 V±0.05 V to 4.75 V±0.05 V, such as LiMnxFe(1−x)PO4 or LMO, for example, the plateau voltage of the LiFePO4 system is 3.20±0.05 V; and the plateau voltage V2 of the second-type battery cell is from 3.60 to 3.80 V±0.05 V, such as the NCM chemical-system battery cell.

The first-type battery cell is conducive to the energy release of the second-type battery cell with high volume energy density, but with the increase of the number of the first-type battery cells, the overall energy density of the battery module is directly reduced. To this end, in the present application, the battery module includes a first-type battery cells and b second-type battery cells, wherein a and b are natural numbers. In some examples, $0.1 \leq a/b \leq 50$, in some other examples, $0.5 \leq a/b \leq 30$, and in some other examples, $1 \leq a/b \leq 10$.

Within the above-mentioned value range of a/b, the overall safety performance of the battery module can be ensured, the characteristic of large energy density of the second-type battery cell is fully exerted, and the overall volume energy density of the battery module is improved, thereby improving the overall performance of the battery module.

If $a \geq 2$, the first-type battery cells and the second-type battery cells are arranged in at least one row, and at least a part of the second-type battery cells is located between the two first-type battery cells, in order to alleviate the problem of local stress concentration caused by the centralized arrangement of the battery cells based on the same chemical system. By means of the reasonable arrangement of the first-type battery cells and the second-type battery cells, the internal stress of the battery can be effectively released, and the safety performance of the battery module is improved.

When the battery module includes multiple first-type battery cells and second-type battery cells, the average capacity $Cap1n$ of the multiple first-type battery cells is greater than the average capacity $Cap2n$ of the second-type battery cells. In some examples, $0.01 \leq (Cap1n/Cap2n) - 1 \leq 0.5$. Within the above range, the safety of the battery module can be ensured, the discharging capacity of the second-type battery cells can be fully released, and at the same time, the safety and the exertion of the overall capacity of the battery can be considered, thereby improving the overall performance of the battery module. $Cap1n$ and $Cap2n$ are set according to the actual requirements of the battery module. In some other examples, $0.02 \leq (Cap1n/Cap2n) - 1 \leq 0.25$, and in still some other examples, $0.04 \leq (Cap1n/Cap2n) - 1 \leq 0.15$.

In addition, the battery cells will dissipate heat during operation. Since the first-type battery cell and the second-type battery cell adopt different chemical systems, their heat dissipation characteristics are different, which in turn causes the local heat difference of the battery module. To this end, the specific heat capacity ratio and the heat conductivity coefficient ratio of the first-type battery cell and the second-type battery cell are controlled to improve the performance of the battery module.

Specifically, the ratio of the specific heat capacity C1 of the first-type battery cell to the specific heat capacity C2 of the second-type battery cell is $0.9 \leq C1/C2 \leq 10$. In some examples, it may be $1 \leq C1/C2 \leq 6$, and in some other examples, it may be $1.5 \leq C1/C2 \leq 3$.

The specific heat capacity refers to the amount of heat absorbed (or released) when a certain material per unit mass rises (or declines) per unit temperature. The greater the specific heat capacity is, the stronger the heat absorption or heat dissipation capability of the material is. When the C1/C2 is controlled within the above range, by controlling the heat absorption capacity of the first-type battery cell and the second-type battery cell, and adjusting the overall heat distribution during the operation of the module, the operating performance of the module is optimized. For example, in a high-temperature operating environment, the battery cell with high specific heat capacity properly absorbs the heat emitted by the battery cell with low specific heat capacity; and in a low-temperature operating environment, the battery cell with low specific heat capacity transfers heat to the battery cell with high specific heat capacity, thereby optimizing the overall heat distribution of the battery module, which in return improves the operating state of the battery module.

The ratio of the heat conductivity coefficient $\lambda 1$ of the first-type battery cell to the heat conductivity coefficient $\lambda 2$ of the second-type battery cell is $0.5 \leq \lambda 1/\lambda 2 \leq 3$. In some examples, it may be $0.7 \leq \lambda 1/\lambda 2 \leq 2$, and in some other examples, it may be $0.9 \leq \lambda 1/\lambda 2 \leq 1.5$. In the present application, the heat conductivity coefficient of the battery cell refers to the heat conductivity coefficient value in the direction from the center of the battery cell to an explosion-proof component of the battery cell.

The heat conductivity coefficient reflects the heat conduction capability of the material, and the higher the value is, the stronger the heat conduction capability is. In the present application, the speed and capability of heat transfer in the first-type battery cell and the second-type battery cell and between the two types of battery cells are controlled by controlling the ratio of the heat conductivity coefficients ($\lambda 1/\lambda 2$) of the first-type battery cell and the second-type battery cell. The value of $\lambda 1/\lambda 2$ is controlled within the above range, in this way, the overall heat transfer rate and the heat distribution of the module can be effectively adjusted to optimize the operating performance of the module. For example, in the high-temperature operating environment, the high-temperature battery cell transfers heat to the low-temperature battery cell in time to avoid the overall performance degradation of the battery module caused by uneven heat distribution; and in the low-temperature operating environment, the high-temperature battery cell transfers heat to the low-temperature battery cell in time to heat up the low-temperature battery cell in time, thereby optimizing the overall heat distribution of the battery module, which in return improves the operating state of the battery module.

The ratio of the density $\rho 1$ of the first-type battery cell to the density $\rho 2$ of the second-type battery cell is $0.6 < \rho 1/\rho 2 \leq 3$. In some examples, it may be $0.8 \leq \rho 1/\rho 2 \leq 2$, and in some other examples, it may be $0.9 \leq \rho 1/\rho 2 \leq 1.5$.

The density of the battery cell also affects the heat transfer capability. In the present application, by controlling the density ratio ($\rho 1/\rho 2$) of the first-type battery cell and the second-type battery cell, the speed and capability of heat transfer in the first-type battery cell and the second-type battery cell and between the two types of battery cells are controlled. The value of $\rho 1/\rho 2$ is controlled within the above range. The overall heat transfer rate and the heat distribution of the module can be effectively adjusted to optimize the operating performance of the module. For example, in the high-temperature operating environment, the high-temperature battery cell transfers heat to the low-temperature battery cell in time to avoid the overall performance degradation of the battery module caused by uneven heat distribution; and in the low-temperature operating environment, the high-temperature battery cell transfers heat to the low-temperature battery cell in time to heat up the low-temperature battery cell in time, thereby optimizing the overall heat distribution of the battery module, which in return improves the operating state of the battery module.

It is worth noting that the specific heat capacity ratio, the heat conductivity coefficient ratio and the density ratio of the first-type battery cell and the second-type battery cell are cooperated, coordinated and debugged based on the types of the battery cells, the structure of the battery module and the application environments to optimize the overall performance of the battery module.

In this embodiment, the first-type battery cell is the LFP chemical-system battery cell, and the second-type battery cell is the NCM chemical-system battery cell, but the choice of the first-type battery cell and the second-type battery cell in other embodiments of the present application is not limited.

For example, if the first-type battery cell is an LFP chemical-system battery cell, the second-type battery cell may be an NCM chemical-system battery cell, a lithium nickel cobalt aluminate chemical-system battery cell, a lithium cobaltate chemical-system battery cell, or a lithium manganate chemical-system battery cell, and the like; and if the second-type battery cell is a ternary material chemical-system battery cell, the first-type battery cell may be an LFP chemical-system battery cell, a lithium nickel cobalt aluminate chemical-system battery cell, a lithium cobaltate chemical-system battery cell, or a lithium manganate chemical-system battery cell, etc.

In addition, the first-type battery cell and the second-type battery cell include, but are not limited to, lithium/sodium/magnesium ion battery cells, lithium/sodium/magnesium metal battery cells, lithium/sodium/magnesium-all-solid-state/semi-solid-state/quasi-solid-state/polymer/gel electrolyte-battery cells, and other rechargeable secondary battery cells.

EXEMPLARY EMBODIMENTS

Embodiment 1. A battery module, comprising:
a first-type battery cell and a second-type battery cell, which are connected in series, wherein the first-type battery cell and the second-type battery cell are battery cells of different chemical systems, and a volume energy density of the first-type battery cell is less than the volume energy density of the second-type battery cell; and
a capacity Cap1 of the first-type battery cell is greater than a capacity Cap2 of the second-type battery cell.

Embodiment 2. The battery module according to embodiment 1, wherein the capacity Cap1 of the first-type battery cell and the capacity Cap2 of the second-type battery cell satisfy the following condition:

$0.01 \leq (Cap1/Cap2)-1 \leq 0.5$, optionally, $0.02 \leq (Cap1/Cap2)-1 \leq 0.25$, and further optionally, $0.04 \leq (Cap1/Cap2)-1 \leq 0.15$.

Embodiment 3. The battery module according to any one of embodiments 1 to 2, wherein the battery module comprises a first-type battery cells and b second-type battery cells, wherein a and b are natural numbers, and $a \geq 1$, $b \geq 1$. $0.1 \leq a/b \leq 50$, optionally, $0.5 \leq a/b \leq 30$, and further optionally, $1 \leq a/b \leq 10$.

Embodiment 4. The battery module according to any one of embodiments 1 to 3, wherein if $a \geq 2$, the first-type battery cells and the second-type battery cells are arranged in at least one row, and at least a part of the second-type battery cells is located between the two first-type battery cells.

Embodiment 5. The battery module according to any one of embodiments 1 to 4, wherein the first-type battery cell and the second-type battery cell satisfy at least one of the following conditions:
a ratio of a specific heat capacity C1 of the first-type battery cell to a specific heat capacity C2 of the second-type battery cell is $0.9 \leq C1/C2 \leq 10$, optionally, $1 \leq C1/C2 \leq 6$, and further optionally, $1.5 \leq C1/C2 \leq 3$;
a ratio of a heat conductivity coefficient $\lambda 1$ of the first-type battery cell to a heat conductivity coefficient $\lambda 2$ of the second-type battery cell is $0.5 \leq \lambda 1/\lambda 2 \leq 3$, optionally, $0.7 \leq \lambda 1/\lambda 2 \leq 2$, and further optionally, $0.9 \leq \lambda 1/\lambda 2 \leq 1.5$; and
a ratio of a density $\rho 1$ of the first-type battery cell to a density $\rho 2$ of the second-type battery cell is $0.6 \leq \rho 1/\rho 2 \leq 3$, optionally, $0.8 \leq \rho 1/\rho 2 \leq 2$, and further optionally, $0.9 \leq \rho 1/\rho 2 \leq 1.5$.

Embodiment 6. The battery module according to any one of embodiments 1 to 5, wherein an average capacity $Cap1n$ of the first-type battery cells is greater than an average capacity $Cap2n$ of the second-type battery cells, further optionally, $0.01 \leq (Cap1n/Cap2n)-1 \leq 0.5$, optionally, $0.02 \leq (Cap1n/Cap2n)-1 \leq 0.25$, and further optionally, $0.04 \leq (Cap1n/Cap2n)-1 \leq 0.15$.

Embodiment 7. The battery module according to any one of embodiments 1 to 6, wherein the first-type battery cell is a lithium iron phosphate chemical-system battery cell.

Embodiment 8. The battery module according to any one of embodiments 1 to 7, wherein the second-type battery cell is a ternary material chemical-system battery cell.

Embodiment 9. The battery module according to any one of embodiments 1 to 8, wherein the first-type battery cell and the second-type battery cell satisfy at least one of the following conditions: a plateau voltage V1 of the first-type battery cell is from 3.15 V±0.05 V to 4.75 V±0.05 V; and a plateau voltage V2 of the second-type battery cell is from 3.60 to 3.80 V±0.05 V.

Embodiment 10. A battery pack, comprising the battery module according to any one of embodiments 1 to 9.

Embodiment 11. An apparatus, comprising the battery module according to any one of embodiments 1 to 9, and using the battery module as a power source.

Embodiment 12. A method for manufacturing a battery module, comprising:
obtaining a first-type battery cell and a second-type battery cell, wherein the first-type battery cell and the second-type battery cell are battery cells of different chemical systems, and the volume energy density of the first-type battery cell is less than the volume energy density of the second-type battery cell; and
connecting the first-type battery cell and the second-type battery cell in series to form a battery module, wherein a capacity Cap1 of the first-type battery cell is greater than a capacity Cap2 of the second-type battery cell.

Embodiment 13. The method according to embodiment 12, wherein the step of obtaining the first-type battery cell and the second-type battery cell comprises: obtaining a first-type battery cells and b second-type battery cells, wherein a and b are natural numbers, and a≥1, b≥1. $0.1 \leq a/b \leq 50$, optionally, $0.5 \leq a/b \leq 30$, and further optionally, $1 \leq a/b \leq 10$.

Embodiment 14. The method according to embodiment 12 or 13, wherein
the step of connecting the first-type battery cell and the second-type battery cell in series comprises:
if a≥2, arranging the first-type battery cells and the second-type battery cells in at least one row, and locating at least a part of the second-type battery cells between the two first-type battery cells; and
connecting the first-type battery cell and the second-type battery cell in series.

Embodiment 15. A device for manufacturing a battery module, comprising
a processor for controlling a clamping arm to obtain a first-type battery cell and a second-type battery cell that are different chemical system battery cells, and further for controlling an assembly component to connect the first-type battery cell and the second-type battery cell in series to form the battery module,
wherein the volume energy density of the first-type battery cell is less than the volume energy density of the second-type battery cell; and
the capacity Cap1 of the first-type battery cell is greater than the capacity Cap2 of the second-type battery cell.

The technical solutions of the present application and the advantages thereof are described in detail below through specific embodiments:

Battery preparation: reference is made to GB/T 31484-2015 "Requirements and Test Methods for Cycle Life of Power Storage Batteries for Electric Vehicles"

The preparation methods of battery cells in various embodiments and comparative examples are as follows.

1. Preparation of Positive Electrode Slurry

A positive electrode material, conductive carbon Super P and a binder polyvinylidene fluoride (PVDF) were fully stirred and mixed in an appropriate amount of N-methylpyrrolidone (abbreviated as NMP) solvent at a weight ratio of 95:3:2 to form uniform and stable slurry with a viscosity of 3000 mPa·s to 20000 mPa·s, and the slurry generated no gelling, stratification or sedimentation and other phenomena within 24 to 48 hours.

2. Preparation of Positive Electrode Plate

The positive electrode material slurry was uniformly coated on a positive electrode current collector Al foil, the electrode plate was cold pressed to a designed pressing pressure after drying, and the positive electrode plate was obtained by slitting the electrode plate for later use.

3. Preparation of Electrolyte

An equal volume of ethylene carbonate was dissolved in propylene carbonate, and then an appropriate amount of lithium hexafluorophosphate was uniformly dissolved in the mixed solvent for later use to obtain the electrolyte.

4. Preparation of Negative Electrode Plate

A negative electrode active material such as graphite, conductive carbon, a binder polystyrene-butadiene copolymer (SBR), a thickener sodium carboxymethylcellulose (CMC) were fully stirred and mixed in an appropriate amount of water solvent at a weight ratio of 95:2:2:1 to form uniform and stable negative electrode slurry; and the slurry was evenly coated on a negative electrode current collector Cu foil, the electrode plate was cold pressed to the designed pressing pressure after drying, and was slit for later use.

5. Separator

PE or PP is selected as the separator.

6. Preparation of a Battery Cell

The positive electrode plate, the separator and the negative electrode plate were wound together by using the conventional battery cell manufacturing process to form a bare battery cell, then the bare battery cell was placed in a battery shell, the electrolyte was injected, then the procedures of forming and sealing were carried out, and a rechargeable power battery cell was obtained at last.

Test Method

1. The test method of the capacity of the battery cell:

The battery cell to be tested was selected, and a battery cell charging and discharging machine and a high and low temperature box were used to test the full charging capacity and the discharging capacity of the battery cell at a standard rate at 25° C. The discharging capacity was the capacity value of the battery cell, wherein the charging and discharging rate was 0.33 C (C represents the rated capacity of the battery cell. The charging/discharging current is the rate multiplied by the rated capacity of the battery cell, and the rated capacity is based on the battery cell capacity identified in the GBT certification document of the battery cell, or the battery module to which the battery cell belongs or the battery pack to which the battery cell belongs).

Specifically: the test procedures of the capacity of the battery cell were as follows: 1) standing for 30 minutes at 25° C.; 2) discharging at constant current of 0.33 C to a discharging cut-off voltage (for example, the NCM chemical-system battery cell was set to 2.8 V, and the LFP chemical-system battery cell was set to 2.5 V), and then standing for 30 minutes; 3) charging at constant current of 0.33 C to a charging cut-off voltage (for example, the NCM chemical-system battery cell was set to 4.2 V, 4.25 V, 4.3 V, 4.35 V, 4.4 V, 4.45 V and the like according to the specific battery cell type, the LFP chemical-system battery cell was generally 3.65 V, and the charging cut-off voltage of the battery cell was recognized as the known information in the industry), charging at a constant voltage until the current is <0.05 C, and then standing for 5 minutes; and 4) discharging at constant current of 0.33 C to the discharging cut-off voltage. At this time, the measured discharging capacity was the capacity value of the battery cell. Related terms and test methods refer to GB/T 19596, GB/T 31484-2015, GB/T 31485-2015, GB/T 31486-2015 and "Safety Requirements for Power Storage Batteries for Electric Vehicles".

2. The test method of the capacity retention rate of the battery cell: refer to GB/T 31484-2015 "Requirements and Test Methods for Cycle Life of Power Storage Batteries for Electric Vehicles".

(1) The test method of the capacity retention rate of 1000 cycles (/25° C.):

The test steps of initial capacity (calculated as: Cap0) included:

1) holding a newly delivered battery cell at 25° C. for 30 minutes; 2) discharging at constant current of 0.33 C to the discharging cut-off voltage (C represented the rated capacity of the battery cell. The charging/discharging current is the rate multiplied by the rated capacity of the battery cell, and the rated capacity is based on the battery cell capacity identified in the GBT certification document of the battery cell, or the battery module to which the battery cell belongs or the battery pack to which the battery cell belongs), and then standing for 30 minutes; 3) charging at constant current of 0.33 C to the charging cut-off voltage, charging at a constant voltage until the current is <0.05 C, and then standing for 5 minutes; and 4) discharging at constant current of 0.33 C to the discharging cut-off voltage, and then standing for 5 minutes. The discharging capacity measured from step 3) to step 4) was counted as Cap0.

Step 1) to step 4) was a charging and discharging cycle of the battery cell.

The above steps 1) to 4) were repeated for 1000 times, the discharging capacity measured at the 1000th time was counted as Capn, and the capacity retention rate at the 1000th time was: Capn/Cap0*100%.

(2) Test on the high-temperature and low-temperature discharging capacity retention rate 1) Holding the newly delivered battery cell at 25° C. for 30 minutes; 2) discharging at constant current of 0.33 C to the discharging cut-off voltage, and then standing for 30 minutes; 3) charging at constant current of 0.33 C to the charging cut-off voltage, and charging at a constant voltage until the current is <0.05 C; 4) controlling a temperature sensing wire on the surface of the battery cell to 40° C., and standing for 2 hours; and 5) discharging at constant current of 0.33 C to the discharging cut-off voltage, and then standing for 5 minutes;

the discharging capacity measured in step 1) to step 5) was counted as Cap10;

6) controlling the temperature sensing wire on the surface of the battery cell to 25° C., and standing for 2 hours; 7) charging at constant current of 0.33 C to the charging cut-off voltage, charging at a constant voltage until the current is <0.05 C, and then standing for 5 minutes; 8) controlling the temperature sensing wire on the surface of the battery cell to a specific temperature (for example, −20° C., or 40° C.), and standing for 2 hours; and 9) discharging at constant current of 0.33 C to the discharging cut-off voltage (for example, 2.1 V), and then standing for 10 minutes.

The discharging capacity measured in step 7) to step 9) was the capacity Capx of the battery cell at a specific temperature.

The capacity retention rate at the specific temperature was: Capx/Cap10*100%.

3. Safety Performance Test

Test 1: the module was heated to triggers a heat runaway test, referring to the document of the Ministry of Industry and Information Technology [2016] No. 377 on Safety Technical Conditions for Electric Motor Coaches.

Whether a battery cell in the module will spread to the adjacent battery cell after heat runaway occurs due to heating is tested. For a test module composed of two or more battery cells to be tested, whether a heat insulation pad needs to be added between the battery cells and the thickness of the heat insulation pad are determined according to the specific scenario, and whether to turn on the water circulation is determined. A method for triggering heating heat runaway is selected, for example, a heating method of heating plate/heating sheet, the battery was fully charged, the simple module was fixed with a fixture, a heating sheet was placed close to the large surface of the first battery cell, and the simple module was fixed with two steel plate fixtures.

The heating sheet was connected to the power supply, the heating was started after a heating sheet power supply device was turned on, until the first battery cell generated heat runaway, the heating sheet was turned off, and the time when the second/Nth battery cell generated heat runaway was observed and recorded; and if the battery cell generating the heat runaway did not cause a fire or explosion to the adjacent battery cell, it was judged that heat spread barrier was realized, or otherwise, it was judged that the heat spread had occurred.

Test 2: the heat runaway test was triggered by module acupuncture, referring to GB/T 31485-2015. Specific test method was as follows:

whether a battery cell in the module will spread to the adjacent battery cell after heat runaway occurs due to acupuncture is tested. For the test module composed of battery cells to be tested, whether a heat insulation pad needs to be added between the battery cells and the thickness of the heat insulation pad are determined according to the specific scenario, and whether to turn on the water circulation is determined. The battery cell was fully charged, and the simple module was fixed with two steel plate fixtures with holes. A Φ3-Φ8 mm high temperature resistant stainless steel needle (the conical angle of the needle angle was 20° to 60°, and the surface of the needle was smooth and clean and free of rust, oxide layer and oil stains) penetrated to the first battery cell from a direction perpendicular to the battery cell at a speed of 0.1-40 mm/s to trigger the heat runaway, and the time when the second/$N^{th}$ battery cell generated the heat runaway was observed and recorded; and if the battery cell generating the heat runaway did not cause a fire or explosion to the adjacent battery cell, it was judged that the heat spread barrier was realized, or otherwise, it was judged that the heat spread had occurred.

In the embodiments of the present application, multiple samples were taken for each group of embodiments to perform the above-mentioned two test methods for the safety performance test. Only when the multiple samples of each group of embodiments passed the above-mentioned tests, "heat spread barrier realization" was affirmed, i.e., the safety requirements were satisfied.

Test Data

TABLE 1

Information of the first-type battery cell

| Serial No. of the first-type battery cell | Positive electrode material of the first-type battery cell | Capacity (Cap1) [Ah] | Plateau voltage (V1) [V] | Volume energy density [Wh/L] | Specific heat capacity (C1) [J/(kg·K)] | Heat conductivity coefficient ($\lambda$1) [W/(m·K)] | Density ($\rho$1) [kg/m3] |
|---|---|---|---|---|---|---|---|
| 11# | $LiFePO_4$ | 151.5 | 3.22 | 345 | 1010 | 1.51 | 2091 |
| 12# | $LiFePO_4$ | 153 | 3.22 | 347 | 1020 | 1.36 | 2078 |
| 13# | $LiFePO_4$ | 156 | 3.22 | 351 | 1030 | 1.33 | 2089 |
| 14# | $LiFePO_4$ | 173 | 3.22 | 360 | 1080 | 1.29 | 2118 |
| 15# | $LiFePO_4$ | 188 | 3.22 | 383 | 1050 | 1.25 | 2189 |
| 16# | $LiMn_{0.7}Fe_{0.3}PO_4$ | 157 | 3.59 | 401 | 1090 | 1.24 | 2318 |
| 17# | $LiMnPO_4$ | 157 | 3.68 | 390 | 1095 | 1.49 | 2422 |
| 18# | $Na_3V_2(PO_4)_2O_2F$ | 99 | 3.65 | 168 | 1045 | 1.65 | 1768 |

TABLE 2

Information of the second-type battery cell

| Serial number of the battery cell | Positive electrode material of the second-type battery cell | Capacity (Cap2) [Ah] | Plateau voltage (V2) [V] | Volume energy density [Wh/L] | Specific heat capacity (C2) [J/(kg·K)] | Heat conductivity coefficient ($\lambda$2) [W/(m·K)] | Density ($\rho$2) [kg/m³] |
|---|---|---|---|---|---|---|---|
| 21# | NCM-811 | 150 | 3.65 | 602 | 810 | 0.91 | 2307 |
| 22# | NCM-721 | 147 | 3.76 | 582 | 871 | 0.95 | 2356 |
| 23# | NCM-622 (95wt %) +LFP (5wt %) | 136 | 3.75 | 569 | 886 | 0.96 | 2442 |
| 24# | NCM-523 (95wt %) +LFP (5wt) | 138 | 3.73 | 551 | 910 | 0.94 | 2493 |

The positive electrode material of the 23# battery cell was 95wt % of NCM-622 and 5wt % of LFP;
The positive electrode material of the 24# battery cell was 95wt % of NCM-523 and 5wt % of LFP;

| | | | | | | | |
|---|---|---|---|---|---|---|---|
| 25# | NCM-333 | 105 | 3.69 | 477 | 962 | 0.98 | 2111 |
| 26# | $Na_{0.93}Cu_{0.22}Fe_{0.3}Mn_{0.48}O_2$ | 93 | 3.25 | 229 | 931 | 0.88 | 1974 |

TABLE 3

Test data in embodiments

| | Serial No. of the first-type battery cell | Number of the first-type battery cells (a) | Serial No. of the second-type battery cell | Number of the second-type battery cells (b) | a/b | C1/C2-1 | Capacity retention rate of 1000 cycles/25° C. | Capacity retention rate/−20° C. | Capacity retention rate/−20° C. | Battery safety test result |
|---|---|---|---|---|---|---|---|---|---|---|
| Ex. 1 | 11# | 100 | 21# | 2 | 50 | 1% | 85% | 86% | 101% | Heat spread barrier realization |
| Ex. 2 | 12# | 90 | 21# | 3 | 30 | 2% | 88% | 83% | 103% | Heat spread barrier realization |
| Ex. 3 | 12# | 90 | 22# | 9 | 10 | 4% | 88% | 83% | 103% | Heat spread barrier realization |
| Ex. 4 | 13# | 50 | 23# | 50 | 1 | 15% | 89% | 85% | 101% | Heat spread barrier realization |
| Ex. 5 | 14# | 35 | 24# | 70 | 0.5 | 25% | 91% | 89% | 102% | Heat spread barrier realization |
| Ex. 6 | 16# | 10 | 25# | 100 | 0.1 | 50% | 87% | 84% | 101% | Heat spread barrier realization |
| Ex. 7 | 18# | 60 | 26# | 30 | 2 | 6% | 89% | 80% | 104% | Heat spread barrier realization |
| CE. 1 | 21# | 100 | 11# | 100 | 1 | 0 | 62% | 83% | 101% | Heat spread barrier realization |

TABLE 3-continued

Test data in embodiments

Comparative examples of a battery with a single-type battery cell

| | Battery cell type | Capacity [Ah] | Number | | | | Capacity retention rate of 1000 cycles/25° C. | Capacity retention rate/−20° C. | Capacity retention rate/−20° C. | Safety test result |
|---|---|---|---|---|---|---|---|---|---|---|
| CE. 2 | 13# | 156 | 100 | / | / | / | 67% | 61% | 100% | Heat spread barrier realization |
| CE. 3 | 21# | 150 | 100 | / | / | / | 89% | 87% | 105% | Heat spread |
| CE. 4 | 12# | 153 | 100 | / | / | / | 77% | 76% | 103% | Heat spread barrier realization |

Note:
the capacity retention rate referred to the retention rate of the battery, i.e., the capacity retention rate measured with each battery cell in the battery module as a whole.

In addition, the present application provides a battery pack, including the above-mentioned battery module.

The present application further provides an apparatus, including the above-mentioned battery module, and using the battery module as a power source.

Figure 5:
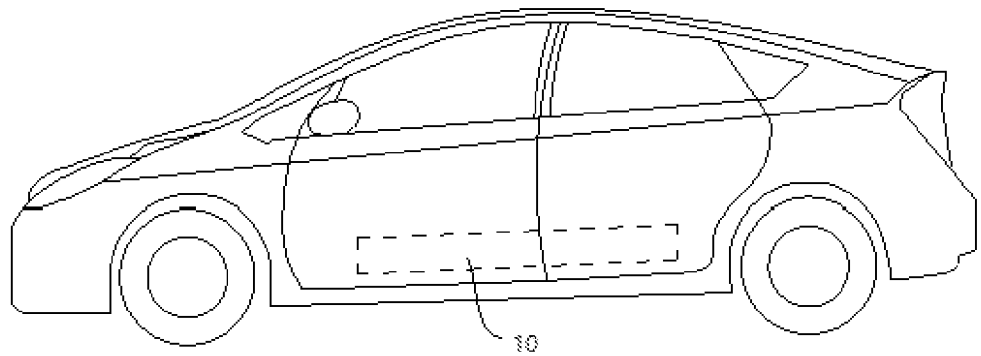
FIG. 5 is a schematic structural diagram of an embodiment of an apparatus of the present application.

Referring to FIG. 5, in this embodiment, the apparatus is a car, and a battery pack 10 is installed in the car to serve as its power source.

It is worth noting that, in other embodiments in this embodiment, the above-mentioned apparatus includes, but is not limited to: vehicles, ships, airplanes, and various energy storage devices. The type and scope of the apparatus are not limited in the present application.

Figure 6:
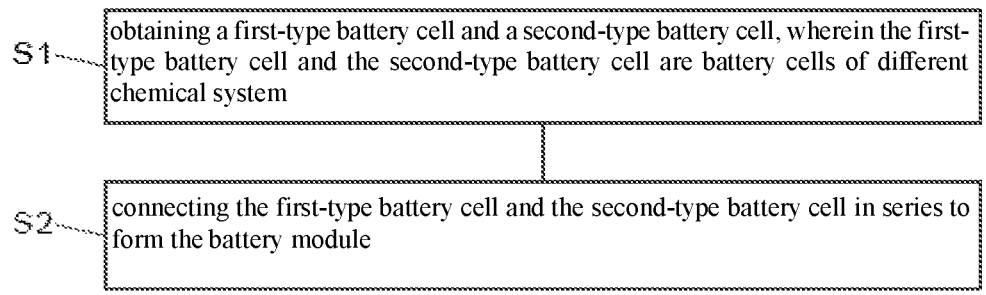
FIG. 6 is a schematic flow diagram of an embodiment of a method for manufacturing the battery module in the present application.

Referring to FIG. 6, the present application further provides a method for manufacturing the battery module, including the following steps S1 and S2:

Step S1, obtaining a first-type battery cell and a second-type battery cell that are battery cells of different chemical systems,
  wherein the volume energy density of the first-type battery cell is less than the volume energy density of the second-type battery cell; and
  the capacity Cap1 of the first-type battery cell is greater than the capacity Cap2 of the second-type battery cell.

The step of obtaining the first-type battery cell and the second-type battery cell includes: obtaining multiple first-type battery cells and multiple second-type battery cells.

In some embodiments, the battery module includes a first-type battery cells and b second-type battery cells, wherein a and b are natural numbers. Further, a≥1, b≥1, 0.1≤a/b≤50, in some examples, 0.5≤a/b≤30, and in some other examples, 1≤a/b≤10.

The number of a and b is not limited, for example, a is 1, 2, 3 . . . n, b is 1, 2, 3 . . . n, and the arrangement of the first-type battery cell and the second-type battery cell is not limited.

Step S2, connecting the first-type battery cell and the second-type battery cell in series to form the battery module.

In some embodiments, the step of connecting the first-type battery cell and the second-type battery cell in series includes: if a≥2, arranging the first-type battery cells and the second-type battery cells in at least one row, and locating at least a part of the second-type battery cells between the two first-type battery cells; and connecting the first-type battery cell and the second-type battery cell in series. The spaced arrangement of the first-type battery cells and the second-type battery cells can enhance the heat conduction between the first-type battery cells and the second-type battery cells, and reduce the stress generated based on expansion between the first-type battery cells and the second-type battery cells, thereby improving the overall performance of the battery cells.

Figure 7:
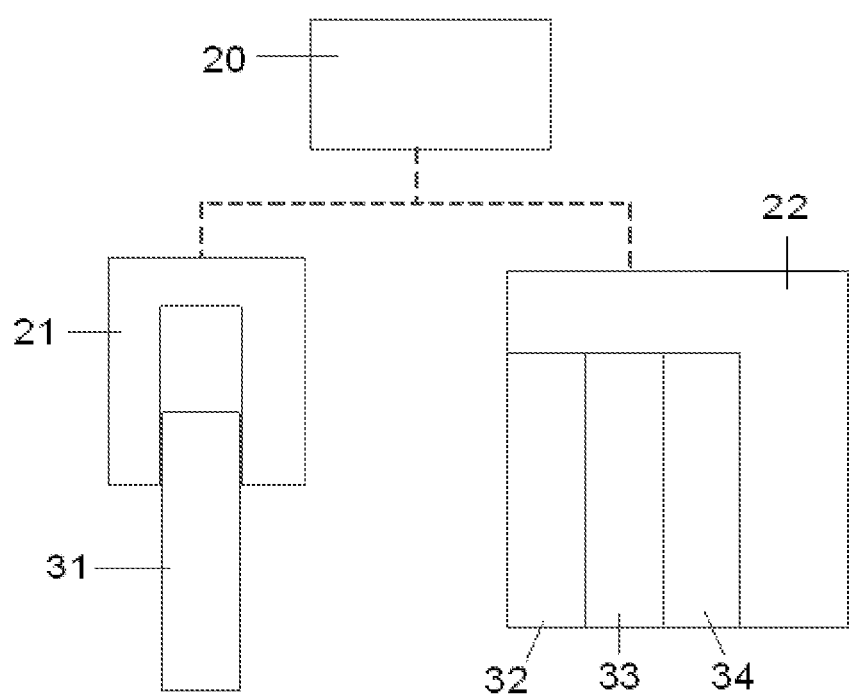
FIG. 7 is a schematic structural diagram of an embodiment of a device for manufacturing the battery module.

This embodiment further provides a device for manufacturing the battery module. Referring to FIG. 7, the device includes a processor 20.

The processor 20 is adapted to controlling a clamping arm 21 to obtain a first-type battery cell 31 and a second-type battery cell (not shown in the figure), wherein the first-type battery cell 31 and the second-type battery cell are battery cells of different chemical systems;
  the processor 20 is further adapted to controlling an assembly component 22 to connect the first-type battery cells 31, 34 and the second-type battery cell 33 in series to form the battery module;
  the volume energy density of the first-type battery cell is less than the volume energy density of the second-type battery cell; and,
  the capacity Cap1 of the first-type battery cell is greater than the capacity Cap2 of the second-type battery cell.

The processor 20, the clamping arm 21 and the assembly component 22, and the method for the processor 20 to control the clamping arm 21 and the assembly component 22 are related arts in the field, which do not limit the protection scope of the present application, and thus will not be repeated herein.

The embodiments or examples in this specification are described in a progressive manner, and each embodiment focuses on the differences from other embodiments, and the same or similar parts between the various embodiments can be referred to each other.

In the description of this specification, the description with reference to the terms "one embodiment", "some embodiments", "exemplary embodiments", "examples", "specific examples", or "some examples" and the like means that the specific features, structures, materials, or characteristics described in combination with the embodiments or examples are included in at least one embodiment or example of the present application. In this specification, the schematic expression of the above-mentioned terms does not necessarily refer to the same embodiment or example. Moreover, the described specific features, structures, materials or characteristics can be combined in any one or more embodiments or examples in a suitable manner.

Finally, it should be noted that the above embodiments are only used to illustrate the technical solutions of the present application, rather than limiting the present application.

Although the present application has been described in detail with reference to the foregoing embodiments, those of ordinary skill in the art should understood that: modifications can still be made to the technical solutions recorded in the foregoing embodiments, or equivalent replacements are made to some or all of the technical features; and these modifications or replacements do not make the essence of the corresponding technical solutions deviate from the scope of the technical solutions of the embodiments of the present application.

What is claimed is:

1. A battery module, comprising:
a first-type battery cell and a second-type battery cell, which are connected in series, wherein the first-type battery cell and the second-type battery cell are battery cells of different chemical systems, and a volume energy density of the first-type battery cell is less than the volume energy density of the second-type battery cell;
a capacity Cap1 of the first-type battery cell is greater than a capacity Cap2 of the second-type battery cell; and
a ratio of a specific heat capacity C1 of the first-type battery cell to a specific heat capacity C2 of the second-type battery cell is $1 \leq C1/C2 \leq 6$.

2. The battery module according to claim 1, wherein the capacity Cap1 of the first-type battery cell and the capacity Cap2 of the second-type battery cell satisfy the following condition:

$$0.01 < (Cap1/Cap2) - 1 \leq 0.5.$$

3. The battery module according to claim 1, wherein the battery module comprises a first-type battery cells and b second-type battery cells, wherein a and b are natural numbers, and $a \geq 1$, $b \geq 1$, $0.1 \leq a/b \leq 50$.

4. The battery module according to claim 3, wherein if $a \geq 2$, the first-type battery cells and the second-type battery cells are arranged in at least one row, and at least a part of the second-type battery cells is located between the two first-type battery cells.

5. The battery module according to claim 1, wherein the first-type battery cell and the second-type battery cell satisfy at least one of the following conditions:
the ratio of the specific heat capacity C1 of the first-type battery cell to the specific heat capacity C2 of the second-type battery cell is $1.5 \leq C1/C2 \leq 3$;
a ratio of a heat conductivity coefficient $\lambda 1$ of the first-type battery cell to a heat conductivity coefficient $\lambda 2$ of the second-type battery cell is $0.5 \leq \lambda 1/\lambda 2 \leq 3$; or
a ratio of a density $\rho 1$ of the first-type battery cell to a density $\rho 2$ of the second-type battery cell is $0.6 \leq \rho 1/\rho 2 \leq 3$.

6. The battery module according to claim 1, wherein an average capacity Cap1n of the first-type battery cells is greater than an average capacity Cap2n of the second-type battery cells.

7. The battery module according to claim 1, wherein the first-type battery cell is a lithium iron phosphate chemical-system battery cell.

8. The battery module according to claim 1, wherein the second-type battery cell is a ternary material chemical-system battery cell.

9. The battery module according to claim 1, wherein the first-type battery cell and the second-type battery cell satisfy at least one of the following conditions: a plateau voltage V1 of the first-type battery cell is from 3.15 V±0.05 V to 4.75 V±0.05 V; or a plateau voltage V2 of the second-type battery cell is from 3.60 to 3.80 V±0.05 V.

10. A battery pack, comprising the battery module according to claim 1.

11. An apparatus, comprising the battery module according to claim 1, and using the battery module as a power source.

12. A method for manufacturing a battery module, comprising:
obtaining a first-type battery cell and a second-type battery cell, wherein the first-type battery cell and the second-type battery cell are battery cells of different chemical systems, and the volume energy density of the first-type battery cell is less than the volume energy density of the second-type battery cell; and
connecting the first-type battery cell and the second-type battery cell in series to form a battery module, wherein
a capacity Cap1 of the first-type battery cell is greater than a capacity Cap2 of the second-type battery cell; and
a ratio of a specific heat capacity C1 of the first-type battery cell to a specific heat capacity C2 of the second-type battery cell is $1 < C1/C2 \leq 6$.

13. The method according to claim 12, wherein the step of obtaining the first-type battery cell and the second-type battery cell comprises: obtaining a first-type battery cells and b second-type battery cells, wherein a and b are natural numbers, and $a \geq 1$, $b \geq 1$, $0.1 \leq a/b \leq 50$.

14. The method according to claim 12, wherein
the step of connecting the first-type battery cell and the second-type battery cell in series comprises:
if $a \geq 2$, arranging the first-type battery cells and the second-type battery cells in at least one row, and locating at least a part of the second-type battery cells between the two first-type battery cells; and
connecting the first-type battery cell and the second-type battery cell in series.

15. The battery module according to claim 1, wherein the capacity Cap1 of the first-type battery cell and the capacity Cap2 of the second-type battery cell satisfy the following condition: $0.02 \leq (Cap1/Cap2) - 1 \leq 0.25$.

16. The battery module according to claim 1, wherein the battery module comprises a first-type battery cells and b second-type battery cells, wherein a and b are natural numbers, and $a \geq 1$, $b \geq 1$, $0.5 \leq a/b \leq 30$.

17. The battery module according to claim 1, wherein the battery module comprises a first-type battery cells and b second-type battery cells, wherein a and b are natural numbers, and $a \geq 1$, $b \geq 1$, $1 \leq a/b \leq 10$.

18. The battery module according to claim 1, wherein the first-type battery cell and the second-type battery cell satisfy at least one of the following conditions:
the ratio of the specific heat capacity C1 of the first-type battery cell to the specific heat capacity C2 of the second-type battery cell is $1.5 \leq C1/C2 \leq 3$;
a ratio of a heat conductivity coefficient $\lambda 1$ of the first-type battery cell to a heat conductivity coefficient $\lambda 2$ of the second-type battery cell is $0.9 \leq \lambda 1/\lambda 2 \leq 1.5$; or
a ratio of a density $\rho 1$ of the first-type battery cell to a density $\rho 2$ of the second-type battery cell is $0.9 \leq \rho 1/\rho 2 \leq 1.5$.

19. The battery module according to claim 1, wherein an average capacity Cap1n of the first-type battery cells is greater than an average capacity Cap2n of the second-type battery cells, $0.01 \leq (Cap1n/Cap2n) - 1 \leq 0.5$.

20. The battery module according to claim 1, wherein an average capacity $Cap1n$ of the first-type battery cells is greater than an average capacity $Cap2n$ of the second-type battery cells, $0.04 \leq (Cap1n/Cap2n) - 1 \leq 0.15$.

* * * * *